UNITED STATES PATENT OFFICE.

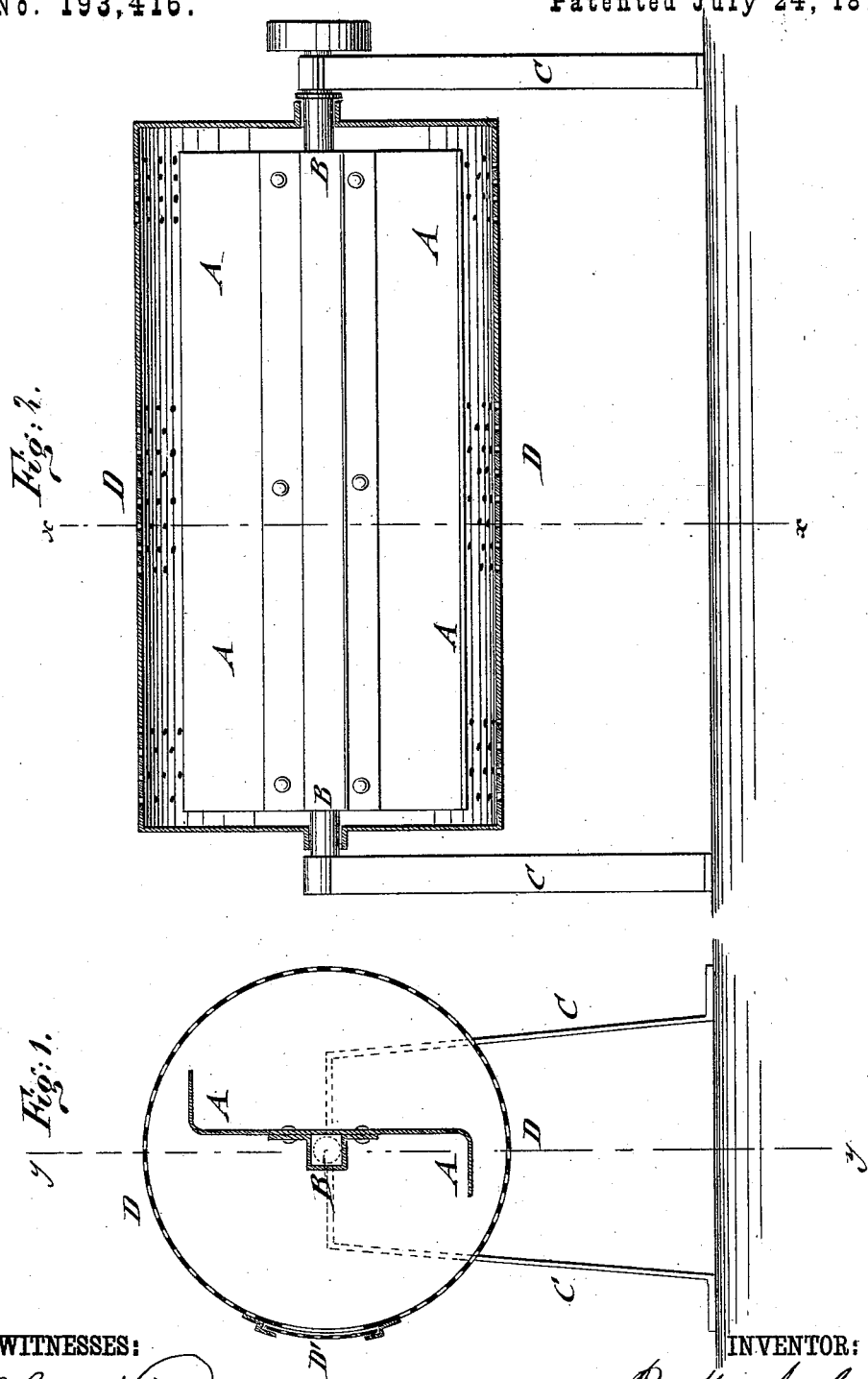

PATRICK McAULIFFE, OF NEW YORK, N. Y.

IMPROVEMENT IN COFFEE-CLEANERS.

Specification forming part of Letters Patent No. 193,416, dated July 24, 1877; application filed June 25, 1877.

*To all whom it may concern:*

Be it known that I, PATRICK MCAULIFFE, of the city, county, and State of New York, have invented a new and Improved Coffee-Cleaning Machine, of which the following is a specification:

In the accompanying drawings, Figure 1 represents a vertical transverse section of my improved coffee-cleaning machine on line $x\,x$, Fig. 2; and Fig. 2, a vertical longitudinal section of the same on line $y\,y$, Fig. 1.

Similar letters of reference indicate corresponding parts.

The invention has reference to an improved machine for cleaning and polishing coffee in superior manner, the machine being of simple construction, run with comparatively small power, and producing a very satisfactory result, as all the skinny particles are screened off and the appearance of the coffee is greatly improved.

The invention consists of revolving scoop-shaped wings or stirrers, in connection with a drum or cylinder mounted loosely on the stirrer-shaft, and following the motion of the stirrers, the drum being made of sheet metal, with laterally alternating perforated and not perforated sections.

In the drawing, A represents the wings or stirrers, which are mounted upon a shaft, B, that is revolved, by any suitable power, in bearings of standards C. Two or more wings or stirrers are mounted rigidly upon a shaft, B, the stirrers extending radially from the shaft, and having scoop-shaped ends for taking up the coffee. The scoop-shaped stirrers revolve inside of a drum or cylinder, D, of sheet metal, which turns loosely by sleeves of its head on the shaft C. The coffee is supplied to or removed from the cylinder by a sliding door, D', which is guided along strips and fastened in suitable manner to prevent its accidental opening. The circumference of cylinder D is made with laterally alternating solid and perforated sections, the perforations serving for the admission of air to keep the coffee in cool state during the revolutions of the stirrers, and also for the purpose of forming exits for the dust, particles of skin, and other impurities. The solid or not perforated portions serve, by the friction with the coffee, for the purpose of polishing the same, and improving thereby the appearance of the beans. The desired quantity of coffee to be cleaned and polished is placed in the cylinder, and the stirrers then revolved at a suitable rate of speed by gearing, belting, or other connection with the power-supplying shaft. The coffee is continually scooped up by the stirrers, lifted and dropped down along the radial plates of the same and along the inner side of the cylinder.

The weight of the coffee and the motion of the stirrers impart to the loosly-mounted cylinder a motion in the same direction as the stirrers, but considerably slower than the same. This produces continuous changes in the position of the coffee in the cylinder, so as to exert an additional cleaning and polishing influence upon the same. The influence of the lifting and dropping of the coffee by the stirrers, in connection with the difference of the motions of the stirrers and cylinder, produces the effective polishing of the coffee by a machine of simple construction and operation.

Having thus fully described my invention, I claim as new and desire to secure by Letters Patent—

As an improvement in coffee cleaning and polishing machines, the combination of revolving radial stirrers or wing-plates, having scoop-shaped ends, with a loosely-mounted cylinder or drum of sheet metal, having laterally alternating perforated and solid or non-perforated sections, said stirrers and cylinder revolving in one direction, but at different speed, substantially in the manner described, and for the purpose specified.

PATRICK McAULIFFE.

Witnesses:
 DONALD McLEAN,
 WM. S. MAGEE.